137-268 SR

10/22/85 OR 4,548,227

United States Patent [19]

Regunathan et al.

[11] Patent Number: 4,548,227

[45] Date of Patent: Oct. 22, 1985

[54] CHEMICAL FEEDER DEVICE

[75] Inventors: Perialwar Regunathan, Wheaton; John W. Tadlock, West Chicago; Dean J. Jarog, Villa Park, all of Ill.

[73] Assignee: Everpure, Inc., Westmont, Ill.

[21] Appl. No.: 532,123

[22] Filed: Sep. 15, 1983

Related U.S. Application Data

[63] Continuation-in-part of Ser. No. 430,480, Sep. 30, 1982, abandoned.

[51] Int. Cl.[4] .............................................. B01D 11/02

[52] U.S. Cl. .................................... 137/268; 422/263; 422/266

[58] Field of Search ............................ 137/268, 205.5; 422/261, 263, 266

[56] References Cited

U.S. PATENT DOCUMENTS

| | | | |
|---|---|---|---|
| 1,887,371 | 11/1932 | Doyle | 137/268 X |
| 3,195,558 | 7/1965 | Klueber | 137/268 |
| 3,590,846 | 7/1971 | Eisele | 137/205.5 X |
| 3,864,090 | 2/1975 | Richards | 137/268 |
| 3,901,262 | 8/1975 | Gutkowski | 137/268 X |

*Primary Examiner*—Alan Cohan
*Attorney, Agent, or Firm*—Frank R. Thienpont

[57] ABSTRACT

A chemical feeder device for treatment of influent liquid and designed for relatively free maintenance being free of moving parts and including a head member to be disposed in a liquid supply line, a vessel detachably connected to the head member and a disposable, replaceable chemical feeder cartridge also attached to the head member and disposed inside the vessel, the cartridge being a unitary structure including pre-inserted chemical material, built-in capillaries, an inlet check valve. The device is designed to feed a concentrated chemical solution into a stream of flowing liquid at a constant, very low resulting chemical concentration independent of liquid pressure, flow rate and interruptions in flow.

47 Claims, 3 Drawing Figures

CHEMICAL FEEDER DEVICE

This application is a continuation-in-part of application Ser. No. 430,480 filed Sept. 30, 1982 now abandoned.

BACKGROUND OF THE INVENTION

This invention relates to a chemical feeding device and more particularly to an apparatus for feeding a concentrated chemical solution developed from a solid chemical material into a stream of flowing liquid.

Various types of apparatus have been used as chemical feeders, but most of these suffer from a number of deficiencies. This is especially true if the external hydraulic conditions into which the feeding operation takes place vary, namely, the pressure, flow rate and constancy of flow. Many of the proportional fluid feeders currently available operate on the principle of the aspirator—fluid flow perpendicular to an orifice creating suction through the orifice—or on the principle of displacement and turbulent mixing. While in some instances these work well after steady state conditions are established in constant flow systems, in changing systems steady state conditions may never be established. This results in random or at least erratic feed levels.

Some of the problems that occur, for example, are that in aspirator designs there is a plugging up with solid debris at the aspiration orifice because the orifice must be small enough to balance the high concentration of the solution being fed. Screens and filters which are fine enough to prevent clogging would also interfere with the suction.

Turbulent displacement designs often are defective in that the internal flow rate must be sufficiently high to promote turbulent mixing. That in turn requires that the solid chemical which dissolves to produce the concentrated feed solution must be able to dissolve very quickly in order to keep pace with the internal flow rate.

SUMMARY OF THE INVENTION

The chemical feeding device described herein is a device without moving parts designed to feed a concentrated chemical solution from a solid chemical into a stream of flowing liquid at a constant, very low resulting chemical concentration independent of liquid pressure, flow rate and interruptions in flow. The apparatus herein described is intended for use in feeding a polyphosphate chemical into a water stream which after leaving the apparatus can be heated or cooled or frozen and used for beverage making—such as ice for soft drinks, cooled water, coffee, hot chocolate or tea. The apparatus could also be used to feed any chemical which has a limited or finite solubility in any liquid for purposes other than those described above.

This chemical feeding device of the present invention includes a head which is adapted to be mounted in a liquid supply line, a disposable feeder cartridge which is attached to the head and a vessel surrounding the feeder cartridge and also attached to the head. Means are provided for bypassing the major proportion of the incoming liquid to be chemically treated while the remaining smaller portion is directed through a chemical containing feeder cartridge containing a solid chemical block having an exposed surface at the upper portion thereof or solid chemical materials with definably exposed surfaces and from which chemical is dissolved forming a chemical feed solution. The feed solution is displaced from the feeder cartridge by a portion of the incoming liquid while the remainder of the incoming liquid is bypassed directly to the outlet. As the feed solution is discharged from the feeder cartridge it mixes with the liquid being bypassed to the outlet to give a treated solution.

A principal object of the present invention is to provide a chemical feeder device for liquid treatment which is substantially maintenance free in that it includes a replaceable and disposable chemical feeder cartridge containing pre-inserted chemical material, and built in orifices and check valves all of which are automatically replaced when the cartridge is replaced.

Another object of the invention is to provide in a replaceable chemical feeder cartridge a built in capillary tube or channel in the cartridge outlet, the capillary tube or channel being appropriately sized to control the flow rate through the cartridge in proportion to the main flow bypassing the cartridge.

Another object of the invention is to provide in a chemical feeder cartridge a solid chemical material such that the surface area exposed to the liquid is reduced thereby limiting and controlling solubility levels in the concentrated solution developed from the chemical material.

Another object of the invention is to provide in a chemical feeder cartridge a construction and arrangement so that only a relatively low concentration of a chemical treating solution will be discharged thus allowing more precision in treatment of the liquid to be treated.

Other objects and advantages of this invention will become more readily apparent when considering the following description and accompanying drawings.

DESCRIPTION OF PREFERRED EMBODIMENTS

Figure 1:
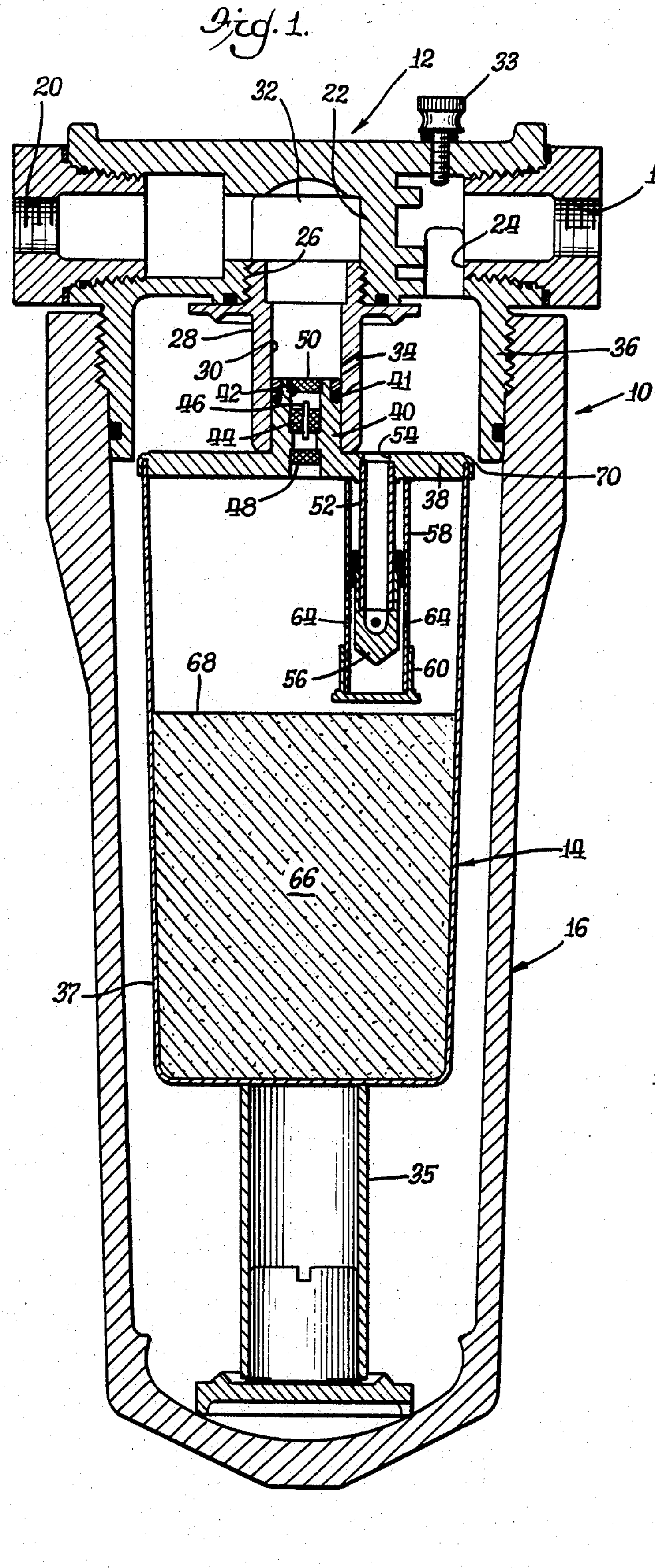
FIG. 1 is a sectional view in elevation of the chemical feeder device embodying the present invention.

We refer now to the drawings wherein like reference characters in the several drawings designate similar parts. Referring to FIG. 1, 10 designates generally a chemical feeder device embodying the invention herein. The chemical feeder device 10 comprises a permanently mounted head 12, a removable disposable feeder cartridge 14 adapted to be attached to the head 12 and a vessel 16 also attached to the head 12 and surrounding or enclosing the disposable feeder cartridge 14.

The head 12 is adapted to be mounted in a liquid feed line and comprises an inlet 18 and outlet 20 said inlet 18 and outlet 20 being separated by a wall 22. An outlet opening 24 is provided in the head 12 which communicates with inlet 18. The head 12 has formed therein at the central portion thereof another opening 26 into which an annular tube-like fitting 28 is secured by a threaded arrangement or other suitable means. This tube-like fitting is formed with a bore 30 which is a guide seat adapted to receive therein an elongated boss formed on the upper end of the feeder cartridge 14. The bore 30 is in liquid communication with an outlet chamber 32 formed in the central part of head 12. The chamber 32 then is in liquid communication with outlet 20. Pressure relief means, here shown as thumbscrew 33, is provided to facilitate removal of vessel 16 for cartridge replacement. The head 12 is formed with a dependent annular flange 36 to which the vessel 16 is attached by threaded engagement or by some other suitable means allowing for easy removal of the vessel 16 from the head 12.

A by-pass orifice 34 is formed in the fitting 28 to bypass most of the influent liquid flowing from the inlet 18 to the outlet 20.

The vessel 16 as here shown is an elongated structure but it could be shorter or longer depending on the size of the disposable feeder cartridge 14 it is designed to accommodate. A spacer member 35 is shown disposed between the bottom of the cartridge 14 and the vessel 16. It will be appreciated that such a spacer may or may not be necessary depending on the length of the cartridge and/or the length of the vessel 16.

The chemical feeder cartridge 14 is a self-contained unitary structure containing within itself the important elements necessary to the overall operation of the feeder device. The cartridge 14 may be an elongated cartridge substantially as shown including a canister body 37 with a lid or cover 38 at its upper end. The canister body 37 preferably is made of a transparent plastic material which facilitates determining when to replace the cartridge. This cover 38 may be constructed with a centrally disposed boss 40 which is disposed in sealed engagement with the bore 30 by suitable means such as O-ring 41. A bore 42 is formed throughout the length of boss 40. A plug 44 is disposed in the bore 42 to support a capillary tube 46.

The size of the capillary tube 46 is designed both by way of length and diameter to control the flow rate through the cartridge 14 in proportion to the main flow bypassing the cartridge 14 through orifice 34. For example, capillary tube of approximately 0.013 inches internal diameter has been found appropriate. A plug with a small hole comparable in diameter to that of the capillary tube may be used instead of the capillary tube. A porous rod also may be used in certain applications in place of the plug or the capillary tube. Small porous filter plugs 48 and 50 are disposed at each end of the bore 42 on each side of the plug 44. These protect the capillary channel from clogging.

The feeder cartridge 14 also includes an inlet tube 52 which communicates at its one end with a hole 54 in the cover 38. At its other end the tube 52 terminates in a back-flow preventing check valve 56. This check valve 56 preferably is of the flapper type and may be made of rubber or other equivalent material. The inlet tube 52 and check valve 56 are enclosed by an outer tube 58 which at its top end is closed by a cap or by attaching to the cover 38 and at the bottom end is closed by means such, for example, as an end cap 60. One or more small openings 64 are formed in the outer tube 58 so that liquid may flow from within the outer tube 58 into the canister body 37 into the space above the chemical disposed in the canister body.

The feeder cartridge 14 contains a chemical to be fed into the stream of influent liquid which proceeds from the inlet 18 to the outlet 20. It is contemplated that the chemical substance that will be disposed in the feeder cartridge 14 to be fed into the liquid stream, is a type of polyphosphate chemical although other chemicals may very well be used depending on the treatment desired for the influent liquid. The chemical substance in the feeder cartridge 14 may be in the form of a solid block 66 which has either been compressed to fit the canister body 37 or formed in place or in the form of solid crystals or pieces placed inside the cartridge container. Whichever way the chemical is disposed in the cartridge 14 a generally definable surface such as a flat surace 68 in the case of a solid block will be left exposed.

The operation of the chemical feeder device will now be described. Liquid to be treated enters inlet 18, passes through opening 24 into the vessel 16 completely filling vessel 16. It will be observed that the feeder cartridge is spaced from the head 12 allowing the vessel 16 to fill via open space 70 between the flange 36 and the feeder cartridge 14. Most of the influent liquid will be bypassed directly to the outlet 20 via the by-pass orifice 34. The orifice 34 is sized in accordance with the flow requirements. It will be observed that the orifice 34 is slanted at an angle or placed in close proximity to the porous plug 50. In One particular application, as here shown, it is disposed so that it is close to and directed at the porous filter plug 50 so that the incoming liquid impinges directly on the plug 50 thus simultaneously effecting both mixing of solution and cleaning of the surface of the plug 50.

Influent liquid also will flow into inlet tube 52, through check valve 56, through openings 64 into the canister body 37 and into the space above the chemical 66. Determination of the position of holes 64 along the length of outer tube 58 affects the diffusion patterns in the concentrated solution in the space above the chemical.

The solid chemical 66 should be a chemical of limited solubility, i.e., one which forms a saturated solution. In some applications the solid chemical should be formed into a solid block with a limited and fairly constant surface area in contact with the solution above it. The chemical is contained in a replaceable, disposable cartridge 14 instead of being contained in the vessel 16. This advantageously, makes it possible to have built-in check valves, orifices and filter plugs periodically and automatically replaced with the replacement of each cartridge. Thus servicing requirements are easy. Outside the cartridge 14, but inside the vessel 16, essentially incoming liquid remains, not concentrated solution. This reduces the incidence of high solution concentration after prolonged periods of no flow in applications where the flow conditions are necessarily intermittent.

Provision of a preformed solid chemical block 66 in some specific applications reduces the surface area exposed to liquid thereby limiting and controlling the solubility levels in the concentrated solution and, therefore, in the effluent liquid.

Influent liquid is introduced into the concentrated solution above the solid chemical through openings 64 at a slow enough rate that turbulence is avoided. This allows the solute concentration gradients to be maintained in the space above the chemical resulting in desired concentration of the chemical in the treated liquid.

As the chemicals dissolve there is established a system of density concentration gradients. The higher levels of concentration will remain near the chemical material while the lower levels of concentration will be near the top of the feeder cartridge 14 and near the outlet from the cartridge. Thus as influent liquid enters the space above the chemicals 66 through openings 64 it will displace treatment water through capillary 66 of relatively low concentration which is at the top of the cartridge near the outlet. This allows for precise control of the degree of treatment of the liquid to be treated.

The manner of replacement of the cartridge 14 should be apparent. Prior to removing the vessel 16, pressure may be relieved by manipulation of the thumbscrew 33 pressure relief means. After the vessel 16 is unscrewed from the head 12 the cartridge 14 is removed from its sealed position in the fitting 28. A new cartridge 14 is inserted and the vessel 16 replaced.

Figure 2:
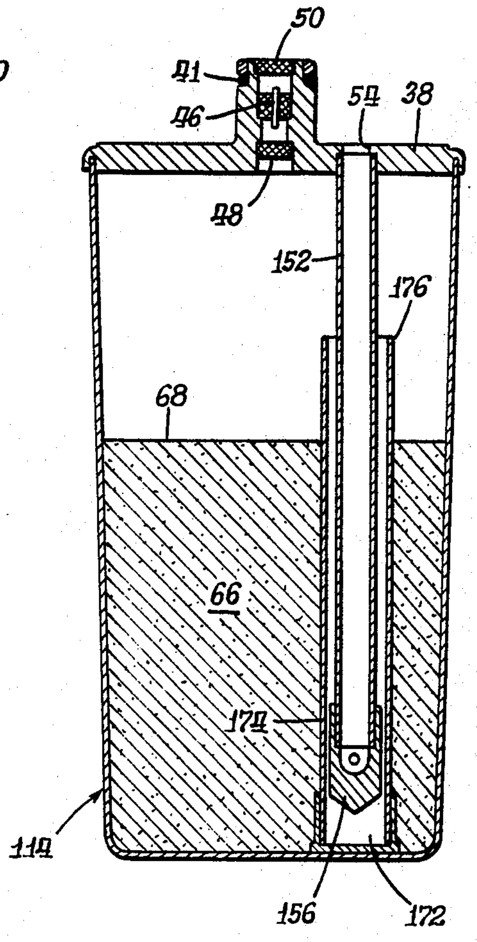
FIG. 2 is a sectional view in elevation of another embodiment of a feeder cartridge forming part of the chemical feeder device.

Another embodiment of the feeder cartridge 114 is shown in FIG. 2. The difference from the cartridge 14 shown in FIG. 1 is that in the cartridge 114 an inlet tube 152 which is connected to hole 54 terminates in check valve 156. The check valve 156 is near the bottom of a well 172 defined by tube 174, which is secured in place in the cartridge. The tube 174 must be secured in place so that its upper lip 176 is a specific distance from the cover 38.

Influent liquid enters inlet tube 152 through opening 54 in the canister cover 38, flows through the check valve 156 into tube 174 in which it rises and then overflows at lip 176. The position of the lip 176 is intended to be at substantially the same distance from the cover 38 as the discharge orifices or openings 64 of the embodiment of FIG. 1.

Figure 3:
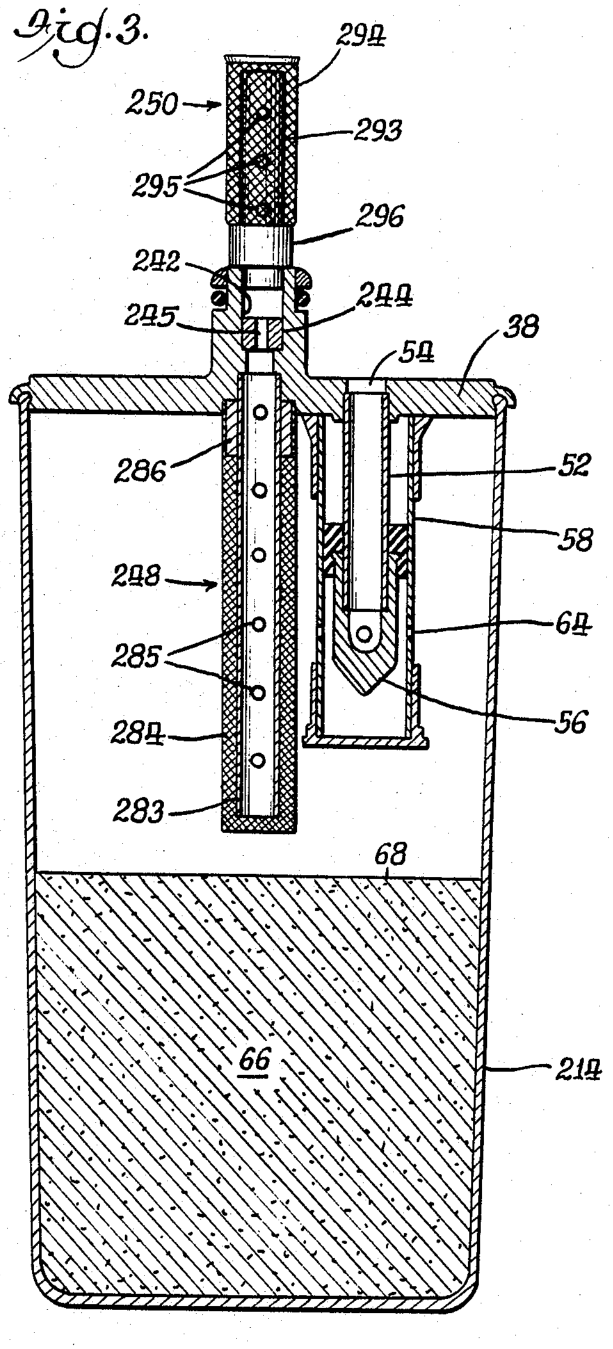
FIG. 3 is a sectional view in elevation of still another embodiment of a feeder cartridge.

A third embodiment of the feeder cartridge 214 is shown in FIG. 3. The difference from the cartridge 14 and 114 shown in FIGS. 1 and 2 is that cartridge 214 includes an inner and outer outlet tube assembly. The inner and outer protective outlet tube assemblies are attached respectively to the inner lower and outer upper portions of bore 242 in the canister cover 38. An orifice plug 244 lies between the two assemblies and is constructed with a small passage 245 to provide a flow restriction. The passage 245 may range in size from 0.005–0.250 inches in diameter depending on the restriction desired.

Since blockage or obstruction in varying degrees may be caused by precipitate formed by either the feeder material itself and/or the variations in the quality of the influent water, the inner and outer protective outlet tube assemblies are provided to help prevent or deter blockage of the orifice plug.

The inner protective outlet tube assembly 248 is disposed upstream from the discharge orifice and comprises an inner outlet tube 283 and an inner outlet tube screen 284 which is disposed around tube 283 and preferably is in hugging contact therewith. A plurality of relatively larger openings 285 are formed in tube 283. The openings may be holes of approximately 1/16" in diameter.

Substantially smaller openings are formed in the screen 284 ranging in size of approximately 10–100 mesh and preferably about 32 mesh. An inner outlet collar 286 is attached to the upper end of screen 284. The collar 286 is secured into canister cover 38 by a press fit or other suitable means to maintain the screen 284 in its position around outlet tube 283. The purpose of the screen 284 is to act as a blocking device to prevent particulate matter from plugging the openings 285 in the inner outlet tube 283 and the opening 245 extending through the orifice 244. The screen 294 can be made of a variety of materials including plastic or stainless steel.

The length and diameter of the inner protective outlet tube is dependent on and determined by the canister volume and the type and volume of feed material used in the canister.

The outer protective outlet tube assembly 250 is disposed downstream from the discharge orifice and includes an outer protective outlet tube 293 and an outer outlet tube screen 294 disposed around tube 293 and preferably in hugging contact therewith. A plurality of relatively larger openings 295 also are formed in tube 293 just as in tube 283 and may be of approximately the same size as in the tube 283. The screen 294 may be of the same material as screen 284, and openings are formed in the screen 284 comparable in size to those in screen 294. Outer outlet collar 296 is attached to screen 294 and helps to secure the screen 294 to tube 293 by being secured to the upper end of boss 40. The length and diameter of the outer outlet tube assembly are dependent on the size of the bore area 30 of the guide seat and the outlet chamber area 32.

In both the inner and outer outlet tube assemblies the tube and the screen surrounding it could be a plastic tube onto which a plastic screen is integrally molded. A one-piece plastic molded screen could also be used in place of the tube and screen molded onto one another.

In operation influent liquid enters the inlet tube 52 through opening 54 in the canister cover 38 and flows through the check valve 56 into tube 58. The influent liquid leaves tube 58 through openings 64 and enters the space containing the feed material. It displaces treatment water through the inner outlet tube assembly 248 upward through the orifice plug 244. The treatment water then passes into and out of the outer outlet tube assembly 250.

It will be apparent that we have provided a chemical feeder device which has substantial advantages. It is substantially maintenance free. The disposable and replaceable feeder cartridge with its pre-included chemicals, built-in check valve and built-in capillaries make it possible by the mere act of replacement of the cartridge to eliminate what otherwise might be substantial maintenance. In addition, the provision of a system of density concentration gradients operates to provide a relatively low concentration at the cartridge outlet thus allowing for maximum precision in the treatment of the liquid.

We claim:

1. A chemical feeder device for treatment of influent liquid comprising:

(a) a head member adapted to be disposed in a liquid inlet line, said head member having an inlet and an outlet;

(b) a replaceable cartridge member connected to said head member constructed and arranged to provide liquid communication between said inlet and outlet, said cartridge containing a chemical material;

(c) a vessel detachably connected to said head member and surrounding said cartridge member;

(d) a bypass orifice disposed in the path of flow from the inlet of said head member to said outlet of said head member;

(e) an inlet opening in the upper wall of said cartridge member in liquid communication with the inlet of said head member;

(f) outlet means formed in the upper wall of said cartridge member for liquid communication with said outlet of said head member;

(g) said outlet means in the upper wall of said cartridge member including a capillary tube and porous filter plugs disposed on each side of said capillary tube.

2. A chemical feeder device for treatment of influent liquid comprising:

(a) a head member adapted to be disposed in a liquid inlet line, said head member having an inlet and an outlet;

(b) a replaceable cartridge member connected to said head member constructed and arranged to provide liquid communication between said inlet and outlet, said cartridge containing a chemical material;

(c) a vessel detachably connected to said head member and surrounding said cartridge member;

(d) a bypass orifice disposed in the path of flow for the inlet of said head member to said outlet of said head member;

(e) an inlet opening in the upper wall of said cartridge member in liquid communication with the inlet of said head member;

(f) outlet means formed in the upper wall of said cartridge member for liquid communication with said outlet of said head member;

(g) an elongated tubular guide seat connected to said head member for connection to said cartridge member;

(h) said outlet means being a tubular structure which is disposed in said tubular guide seat; and wherein (i) said tubular outlet means includes a capillary tube and porous plugs disposed on each side of said capillary tube in said outlet means.

3. The device of claim 2 wherein said bypass orifice is cisposed in said tubular guide seat at an angle and is directed to pass its discharge onto said outlet means of said cartridge member.

4. The device of claim 1 in which said chemical material is in the form of a substantially solid block disposed in said cartridge member.

5. The device of claim 1 wherein at least a portion of said cartridge member is made of a transparent plastic material.

6. The device of claim 1 including pressure relief means disposed in said head member to facilitate removal of said vessel for replacement of said cartridge member.

7. A chemical feeder device for treatment of influent liquid comprising:

(a) a head member adapted to be disposed in a liquid inlet line, said head member having an inlet and an outlet;

(b) a replaceable cartridge member connected to said head member constructed and arranged to provide liquid communication between said inlet and outlet, said cartridge containing a chemical material;

(c) a vessel detachably connected to said head member and surrounding said cartridge member;

(d) a bypass orifice disposed in the path of flow from the inlet of said head member to said outlet of said head member;

(e) an inlet opening in the upper wall of said cartridge member in liquid communication with the inlet of said head mem- ber;

(f) an inlet tube disposed within said cartridge member having one end communicating with said cartridge member inlet opening;

(g) a check valve connected to the other end of said inlet tube;

(h) a tubular member disposed within said cartridge member and surrounding said inlet tube, one end of said tubular member being sealed to define a chamber between said tubular member and the outlet from said inlet tube;

(i) means associated with said tubular member to provide communication between said chamber and said cartridge member; and (j) outlet means formed in the upper wall of said cartridge member for liquid communication with said outlet of said head member.

8. The device of claim 7 including (a) an elongated tubular guide seat connected to said head member for connection to said cartridge member, and wherein (b) said outlet means formed in the upper wall of said cartridge member is a tubular structure which is disposed in said tubular guide seat.

9. The device of claim 7 wherein said outlet means includes a capillary tube.

10. The device of claim 9 including porous filter plugs disposed on each side of said capillary tube in said outlet means.

11. The device of claim 8 wherein said tubular outlet means includes a capillary tube and porous plugs disposed on each side of said capillary tube in said, tubular outlet means.

12. The device of claim 8 wherein said bypass orifice is disposed in said tubular guide seat at an angle and is directed to pass its discharge onto said outlet means of said cartridge member.

13. The device of claim 7 in which said chemical material is in the form of a substantially solid block disposed in said cartridge member.

14. The device of claim 7 wherein at least a portion of said cartridge member is made of a transparent plastic material.

15. The device of claim 7 including pressure relief means disposed in said head member to facilitate removal of said vessel for replacement of said cartridge member.

16. The device of claim 7 in which said means associated with said tubular member to provide communication between said chamber and said cartridge member comprises one or more openings in said tubular member wall.

17. The device of claim 7 in which said means associated with said tubular member to provide communication between said chamber and said cartridge member comprises the upper open lip of said tubular member for allowing overflow of liquid.

18. A unitary disposable chemical feeder cartridge comprising:

(a) a canister body;

(b) a chemical material disposed in said canister body;

(c) a cover attached to the upper end of said canister body;

(d) an inlet into said canister body, said inlet including an inlet tube projecting into said cartridge and further including a flapper type check valve connected to the outlet from said inlet tube;

(e) a discharge orifice from said canister body disposed in said cover;

(f) said cartridge being adapted to be inserted as a self-contained unit into a chemical feeder device and removed therefrom for replacement.

19. The feeder cartridge of claim 18 in which said chemical material is in the form of a solid block disposed in said canister.

20. The feeder cartridge of claim 18 in which said canister body is made of a transparent plastic material.

21. The feeder cartridge of claims 18 or 19 in which said chemical material is a polyphosphate.

22. The feeder cartridge of claims 18 or 19 in which said chemical material is a material of low solubility.

23. The feeder cartridge of claim 18 which said discharge orifice from said canister body is a capillary tube.

24. The feeder cartridge of claim 18 in which said discharge orifice from said canister body is a porous plug.

25. The feeder cartridge of claim 18 in which said discharge orifice from said canister body is a capillary tube having an internal diameter of approximately 0.013 inches.

26. The feeder cartridge of claim 18 in which a check valve is associated with said inlet.

27. The feeder cartridge of claim 18 in which said inlet includes an inlet tube projecting into said cartridge and further including a flapper type check valve connected to the outlet from said inlet tube.

28. A unitary disposable chemical feeder cartridge comprising:

(a) a canister body;
(b) a chemical material disposed in said canister body;
(c) a cover attached to the upper end of said canister body;
(d) an inlet tube projecting into said canister body;
(e) a check valve disposed at the inward end of said inlet tube;
(f) tube means defining a well disposed at the end of the inlet tube and into which the inlet tube is adapted to discharge;
(g) means associated with said tube means to establish communication between said well and the internal space in said canister body above said chemical material; and
(h) a discharge orifice from said canister body disposed in said cover.

29. The feeder cartridge of claim 28 in which said chemical material is in the form of a solid block disposed in said canister.

30. The feeder cartridge of claim 28 in which said canister body is made of a transparent plastic material.

31. The feeder cartridge of claims 28 or 29 in which said chemical material is a polyphosphate.

32. The feeder cartridge of claims 28 or 29 which said chemical material is a material of low solubility.

33. The feeder cartridge of claim 28 in which said discharge orifice from said canister body is a capillary tube.

34. The feeder cartridge of claim 28 in which said discharge orifice from said canister body is a porous plug.

35. The feeder cartridge of claim 28 in which said discharge orifice from said canister body is a capillary tube having an internal diameter of approximately 0.013 inches.

36. The feeder cartridge of claim 28 in which said means associated with said tube means comprises one or more openings in the tube wall.

37. The feeder cartridge of claim 28 in which said means associated with said tube means comprises the upper open lip of said tube means for allowing overflow of liquid.

38. The feeder cartridge of claim 28 in which a check valve is connected to said inlet tube to prevent backflow through said inlet tube out of the canister body.

39. The feeder cartridge of claim 18 including
protective screen means operatively associated with said discharge orifice for protecting said discharge orifice from clogging.

40. The feeder cartridge of claim 18 including
a protective outlet tube assembly operatively associated with said discharge orifice.

41. The feeder cartridge of claim 28 including a protective outlet tube assembly operatively associated with said discharge orifice.

42. The feeder cartridge of claim 28 including Protective screen means operatively associated with said discharge orifice for protecting said discharge orifice from clogging.

43. A unitary disposable chemical feeder cartridge comprising:

(a) A canister body;
(b) a chemical material disposed in said canister body;
(c) a cover attached to the upper end of said canister body;
(d) an inlet into said canister body;
(e) a discharge orifice from said canister body disposed in said cover;
(f) said cartridge being adapted to be inserted as a self-contained unit into a chemical feeder device and removed therefrom for replacement;
(g) protective screen means operatively associated with said discharge orifice for protecting said discharge orifice from clogging, said protective screen means including a first protective screen positioned upstream from said discharge orifice and a second protective screen positioned downstream from said discharge orifice.

44. A unitary disposable chemical feeder cartridge comprising:

(a) a canister body;
(b) a chemical material disposed in said canister body;
(c) a cover attached to the upper end of said canister body;
(d) an inlet into said canister body;
(e) a discharge orifice from said canister body disposed in said cover;
(f) said cartridge being adapted to be inserted as a self-contained unit into a chemical feeder device and removed therefrom for replacement;
(g) a protective outlet tube assembly operatively associated with said discharge orifice, said protective outlet tube assembly further including
an elongated outlet tube connected to said cover in communication with said discharge orifice and extending into said canister body upstream from said discharge orifice;
means defining a plurality of openings in said outlet tube and disposed along the length thereof and a screen member disposed around said elongated outlet tube.

45. The feeder cartridge of claim 44 wherein
said screen member has openings which are smaller than said openings in said outlet tube.

46. The feeder cartridge of claim 44 including
a second protective outlet tube assembly operatively associated said discharge orifice, said second protective outlet tube assembly comprising:

a second elongated outlet tube connected to said cover in communication with the discharge orifice downstream from said discharge orifice;

means defining a plurality of openings in said second elongated outlet tube and disposed along the length thereof; and a screen member disposed around said second elongated outlet tube.

47. A unitary disposable chemical feeder cartridge comprising:

(a) a canister body;

(b) a chemical material disposed in said canister body;

(c) a cover attached to the upper end of said canister body;

(d) an inlet into said canister body;

(e) a discharge orifice from said canister body disposed in said cover;

(f) said cartridge being adapted to be inserted as a self-contained unit into a chemical feeder device and removed therefrom for replacement;

(g) a protective outlet tube assembly operatively associated with said discharge orifice, said protective outlet tube assembly comprising, an elongated outlet tube connected to said cover in communication with the discharge orifice downstream from said discharge orifice;

means defining a plurality of openings in said outlet tube and disposed along the length thereof; and (h) a screen member disposed around said outlet tube.

* * * * *